(No Model.)
I. J. GRIFFIN.
FLUID PRESSURE REGULATOR.
No. 436,235. Patented Sept. 9, 1890.
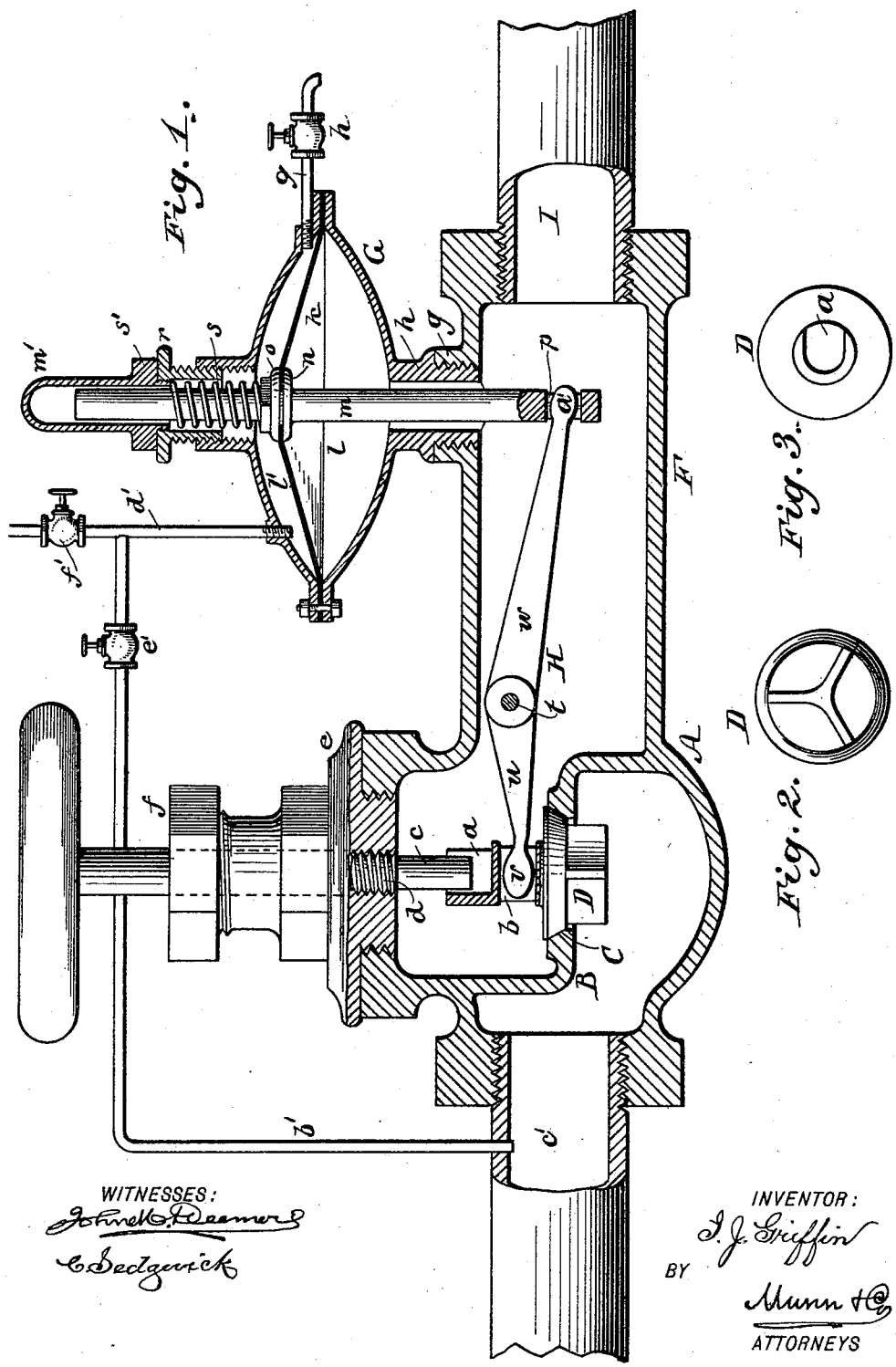
WITNESSES:
INVENTOR:
I. J. Griffin
BY
Munn & Co.
ATTORNEYS

UNITED STATES PATENT OFFICE.

IRA J. GRIFFIN, OF SING SING, NEW YORK.

FLUID-PRESSURE REGULATOR.

SPECIFICATION forming part of Letters Patent No. 436,235, dated September 9, 1890.

Application filed February 10, 1890. Serial No. 339,841. (No model.)

*To all whom it may concern:*

Be it known that I, IRA J. GRIFFIN, of Sing Sing, in the county of Westchester and State of New York, have invented a new and Improved Fluid-Pressure Regulator, of which the following is a specification, reference being had to the annexed drawings, forming a part thereof, in which—

Figure 1 is a longitudinal section of the regulator. Fig. 2 is an inverted plan view of the valve, and Fig. 3 is a plan view of the valve.

Similar letters of reference indicate corresponding parts in all the views.

The object of my invention is to construct a device for regulating the flow of fluids through pipes, so as to always maintain a uniform pressure in the receiving-pipe; also to reduce the pressure in the receiving-pipe to any desired degree.

The invention consists in the construction hereinafter described and claimed.

The valve-casing A is provided with the usual offset portion B, in which is formed a valve-seat C. To the valve-seat C is fitted the valve D, having an upwardly-extending centrally-bored stem $a$. It is also provided with a transverse mortise $b$.

In the bore of the stem $a$ is inserted the end of the spindle $c$, which is provided with a threaded portion $d$, passing through the cap $e$ of the valve-casing and furnished at its outer end with a hand-wheel E. The spindle $c$ is packed outside of the threaded portion by means of a gland $f$ in the usual way. The casing A on the discharge side of the valve D is elongated, forming a cylindrical chamber F, which is furnished on its upper side with a threaded boss $g$, to which is fitted the threaded part $h$ of the diaphragm-casing G. The diaphragm-casing G is made in two concavo-convex halves $i$ $i'$, fastened together by bolts $j$. The flexible diaphragm $k$ is interposed between the two halves of the valve-casing G and divides it into two compartments $l$ $l'$. A rod $m$ passes through the center of the diaphragm and is furnished with a collar $n$, against which the diaphragm is clamped by the nut $o$ on the threaded portion of the rod. The lower end of the rod $m$ projects into the chamber F and is provided with a transverse mortise $p$. The part $i'$ of the diaphragm-casing is provided with a longitudinally-threaded boss $q$, to which is fitted a screw-collar $r$, provided with a cap $m'$, which forms a guide for the upper end of the rod $m$ and an abutment for the spiral spring $s$, which is placed in the collar $r$ and presses upon the nut $o$. The cap $m'$ is provided with a square or hexagonal part $s'$ for receiving a wrench.

In the chamber F is pivoted a lever H, of the first order, upon the pin $t$. The shorter arm $u$ of the lever H is provided with an elliptical end $v$, which projects into the mortise $b$ of the stem $a$. The longer arm $w$ of the lever H is provided with an elliptical end $a'$, which projects into the mortise $p$ of the rod $m$.

A pipe $b'$ is connected with the supply-pipe $c'$ and communicates with the pipe $d'$, entering the compartment $l'$ of the diaphragm-casing G. The pipe $b'$ is provided with a valve $e'$. The pipe $d'$ is prolonged beyond the pipe $b'$ and is provided with a valve $f'$. The casing G is also provided with a discharge-pipe $g'$, having a valve $h'$, which communicates with the compartment $l'$. The fluid entering the valve-casing A under the valve D presses the valve upward, thus allowing the fluid to pass through the chamber F into the discharge-pipe I. So long as the pressure in the chamber F and in the compartment $l$ of the diaphragm-casing G, connected therewith, is below the prescribed limit the valve D remains open and the liquid flows through; but as soon as the pressure in the pipe I and chamber F approaches the limit the diaphragm $k$ is forced in opposition to the pressure of the spring $s$, thereby moving upward the longer arm of the lever H, thus causing the valve D to be forced downward toward its seat. This operation reduces the flow of liquid through the valve-casing A, so that the pressure in the chamber F and pipe I is maintained at a fixed point. Any increase in the flow of liquid through the pipe I reduces the pressure in the chamber F and diaphragm-casing G and allows the spring $s$ to force the rod $m$ downward, thereby causing the lifting of the valve D, thus again increasing the pressure in the chamber F. In this manner the diaphragm $k$ serves to control the opening of the valve D, and by this means to regulate the flow of the liquid through the valve, and consequently the pressure in the chamber F and pipe I. By arranging the side opening of the valve-casing and the diaphragm upon the same side of the lever H, they are made easily accessible and may be readily got at for adjustment or repair.

Having thus described my invention, I claim as new and desire to secure by Letters Patent—

1. The combination, with the straight casing A, having its inlet and outlet ends in the same plane, a valve-seat C in said casing near its inlet end, an opening through the casing above the valve-seat provided with a cap $e$, a valve D, resting on the seat and provided with a stem projecting toward the said cap, and the spindle $c$, extending down through the cap and engaging the stem, of a casing G, connected with the casing A near its outlet end and on the same side thereof as the cap $e$, a diaphragm in the casing, a rod $m$, connected therewith and entering the casing A parallel with the spindle $c$, and the longitudinally-extending lever H, the short arm of which is connected with the valve-stem and the long arm with the rod $m$, substantially as set forth.

2. The combination of the straight casing A, having a valve-seat C near its inlet end, a removable cap on its upper side over the seat, a valve on the seat, a spindle extending down through the cap to limit the rise of the valve, a casing G, having a neck $h$ screwed into the upper side of the casing A beyond the cap $e$ and provided with a diaphragm, a rod $m$, connected between the ends of the diaphragm and entering the said casing A, the lever H, connecting the lower end of rod $m$ with the valve, the cap $m'$ on top of the casing G and inclosing the upper end of rod $m$, and the spiral spring $s$ on the rod above the diaphragm, substantially as set forth.

3. The herein-described pressure-regulator, consisting in the straight casing A, having its inlet-pipe $c'$ in line with its bore, a valve-seat C, valve D, and spindle $c$ at the inlet end of the casing, the casing G on top of casing A, near its outlet end, the diaphragm therein, the spring-pressed rod extending from the diaphragm into the casing A, the lever H, connecting said valve and rod, the pipes $b'$ $d'$, connecting the inlet $c'$ with the casing G above the diaphragm, a valve $e'$ in pipe $b'$, a valve $f'$ in pipe $d'$ above the pipe $b'$, and the valved discharge-pipe $g'$, substantially as set forth.

IRA J. GRIFFIN.

Witnesses:
RODNEY S. LOCKWOOD,
WALTER SMITH.